Sept. 6, 1927.
H. E. NORVIEL
1,641,396
CONTROL DEVICE
Filed April 24, 1926
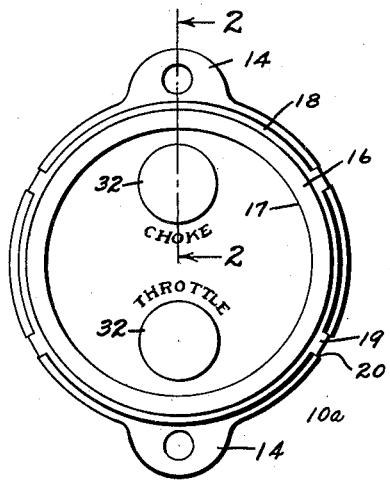
Fig. 1
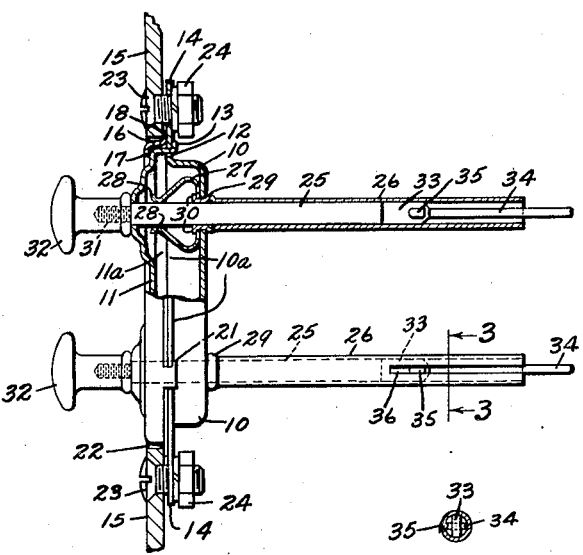
Fig. 2
Fig. 3
Inventor
Harry E. Norviel
By Spencer Suvall & Hardman
his Attorneys Patented Sept. 6, 1927.

1,641,396

UNITED STATES PATENT OFFICE.

HARRY E. NORVIEL, OF ANDERSON, INDIANA, ASSIGNOR, BY MESNE ASSIGNMENTS, TO DELCO-REMY CORPORATION, OF DAYTON, OHIO, A CORPORATION OF DELAWARE.

CONTROL DEVICE.

Application filed April 24, 1926. Serial No. 104,500.

This invention relates to control devices which are particularly adapted to be mounted upon the instrument board of an automobile for the purpose of controlling parts of the automobile which are located at a distance from the driver, such as the carburetor.

It is among the objects of the invention to simplify the construction of devices of this character in order to reduce the cost of manufacture thereof.

Further objects and advantages of the present invention will be apparent from the following description, reference being had to the accompanying drawings, wherein a preferred form of the present invention is clearly shown.

In the drawings:

Fig. 1 is a front view of a form of the present invention;

Fig. 2 is a side view partly in section, the section being taken on the line 2—2 of Fig. 1; and Fig. 3 is a sectional view on the line 3—3 of Fig. 2.

Referring to the drawings, the control device comprises a dished member 10 of sheet metal to which is secured a cover 11, also formed of sheet metal. These members are attached together by providing the member 10 with a number of holes 12 each adapted to receive a tang 13 provided by the member 11. After the tangs 13 are passed through the holes 12, they are bent as shown in Fig. 2, in order that the edge 11ª of the member 11 and the flange 10ª of the member 10 will be maintained in engagement. The flange 10ª is provided with apertured ears 14, which adapt the member 10 for mounting upon an instrument board 15 of an automobile. The control apparatus includes a finishing ring or bezel ring 16 having an inwardly-extending flange 17 which engages the member 11, and having an outwardly-extending annular flange 18 which engages the flange 10ª of the member 10. The finishing ring 16 is secured by providing it with a number of tangs 19 which are received by suitable notches 20 provided by the members 10 and 11, the tangs 19 being bent against the rear side of the flange 10ª, as indicated by numeral 21 in Fig. 2. The instrument board 15 is provided with an aperture 22 for receiving the finishing ring 16, and the control device is secured in the position shown in Fig. 2 by screws 23 passing through the instrument board 15 and the apertured ears 14 of the part 12, and by nuts 24 which are threaded upon the screws 23.

The members 10 and 11 are provided with aligned apertures through which a rod 25 may extend. The rod 25 is received by a tube 26 which projects through the aperture in the rear wall of the member 10, and also through an aperture in the yoke portion of a leaf-spring member 27 which includes resilient fingers 28 which frictionally engage the opposite sides of the rod 25. The tube 26 is provided with a shoulder 29 adapted to engage the rear side of the member 10 so that, when the inner end of the tube 26 is flared against the member 27, as indicated by numeral 30 in Fig. 2, the members 26 and 27 will be secured to the member 10.

One end of the rod 25 is provided with a threaded portion 31 of smaller diameter, which is received by a tapped hole in a handle or knob 32. The other end of the rod 25 includes a flat portion 33 which is apertured to receive a wire 34 having its hooked end 35 extending through the aperture and also into a slot 36 provided by the tube 26. Thus the wire 34 is prevented from rotating. The wire 34 may be attached to apparatus located at a distance from the instrument board, such as to a carburetor. If the wire 34 forms a part of a Bowden wire control, it is enclosed by a tube (not shown) which prevents buckling of the wire. One end of this tube may be secured to the tube 26.

The instrument shown in the drawings is provided with two control handles or knobs 32, each for operating a control wire 34. As indicated in Fig. 1, the upper knob 32 may be used to operate the carburetor choke valve, and the lower knob to operate the throttle valve. Obviously, the control is effected by moving the rods 25 endwise to a desired position in which they will be yieldingly maintained, due to the frictional engagement of the spring members 28 with the rods.

I claim:—

1. A control device comprising, in combination, a mounting bracket, a tube attached to the bracket, a rod slidable through the tube, and a plurality of leaf spring members attached to the bracket and bearing upon the rod.

2. A control device comprising, in combination, a mounting bracket, a tube attached to the bracket, a rod slidable through the tube, and a pair of leaf spring members attached to the bracket and frictionally engaging opposite sides of the rod.

3. A control device comprising, in combination, a mounting bracket having an aperture, a tube extending through said aperture, a rod slidable through the tube, a leaf spring member having its central portion provided with an aperture for receiving the tube and having its end portions frictionally engaging the rod, and means provided by the rod for attaching the rod and leaf spring member to the bracket.

4. A control device comprising, in combination, a dished member of sheet metal, a cover member, means for attaching said members to provide a housing, said members being provided with aligned holes and one of them shaped to form a mounting bracket, a tube extending through the hole in one of the members, a rod extending through the holes of both members and the tube, and leaf spring members located within the housing and attached to one of the housing members and bearing against the portion of the tube exposed within the housing.

In testimony whereof I hereto affix my signature.

HARRY E. NORVIEL.